US011608826B2

(12) United States Patent
Danielski et al.

(10) Patent No.: US 11,608,826 B2
(45) Date of Patent: Mar. 21, 2023

(54) SYSTEM AND METHOD FOR TIRE REPAIR

(71) Applicant: Honda Motor Co., Ltd., Tokyo (JP)

(72) Inventors: Daryl Adam Danielski, Sunnyvale, CA (US); Rahul Khanna, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 916 days.

(21) Appl. No.: 16/442,863

(22) Filed: Jun. 17, 2019

(65) Prior Publication Data
US 2020/0391560 A1    Dec. 17, 2020

(51) Int. Cl.
| | |
|---|---|
| F04B 49/08 | (2006.01) |
| B60C 25/02 | (2006.01) |
| F04B 35/06 | (2006.01) |
| B60C 23/00 | (2006.01) |
| B60C 23/06 | (2006.01) |

(52) U.S. Cl.
CPC ............ *F04B 49/08* (2013.01); *B60C 23/002* (2013.01); *B60C 23/064* (2013.01); *B60C 25/025* (2013.01); *F04B 35/06* (2013.01)

(58) Field of Classification Search
None
See application file for complete search history.

(56) References Cited

U.S. PATENT DOCUMENTS

| | | | |
|---|---|---|---|
| 4,706,937 A | 11/1987 | Chung | |
| 5,765,810 A | 6/1998 | Mattera | |
| 5,850,036 A * | 12/1998 | Giromini | G01M 3/202 73/40 |
| 6,877,200 B2 | 4/2005 | Villarreal | |
| 9,855,929 B2 | 1/2018 | Bennett | |
| 9,889,824 B2 | 2/2018 | Jackson, Sr. | |
| 2017/0174188 A1* | 6/2017 | Bennett | B66F 3/42 |
| 2017/0253243 A1* | 9/2017 | Dudar | B60W 10/18 |
| 2018/0375371 A1* | 12/2018 | Duhaut | H01M 10/425 |

FOREIGN PATENT DOCUMENTS

| | | | | |
|---|---|---|---|---|
| DE | 202005017071 U1 * | 4/2007 | | B29C 73/166 |
| WO | WO-2014117098 A2 * | 7/2014 | | B29C 73/166 |

OTHER PUBLICATIONS

English Translation of DE 20 2005 017 071 U1 (filed Oct. 28, 2005 and published Mar. 15, 2007) using Google Patents (Year: 2005).*

* cited by examiner

*Primary Examiner* — Thomas E Worden
(74) *Attorney, Agent, or Firm* — Rankin, Hill & Clark LLP

(57) ABSTRACT

A repair system for a vehicle includes a base and a lift component movably secured to the base for lifting a portion of a frame of the vehicle. An air compressor unit is disposed on the base and has a discharge hose configured to be selectively connected to the tire for delivering compressed. A sealant reservoir is disposed on the base and filled with a flat tire sealant. The discharge hose is optionally configured to deliver the flat tire sealant to the tire. A controller is disposed on the base and receives tire data from the vehicle and controls discharge of the compressed air from the air compressor unit to the tire and optionally controls discharge of the flat tire sealant to the tire based on the tire data. The tire data includes a tire pressure reading associated with the tire.

6 Claims, 6 Drawing Sheets

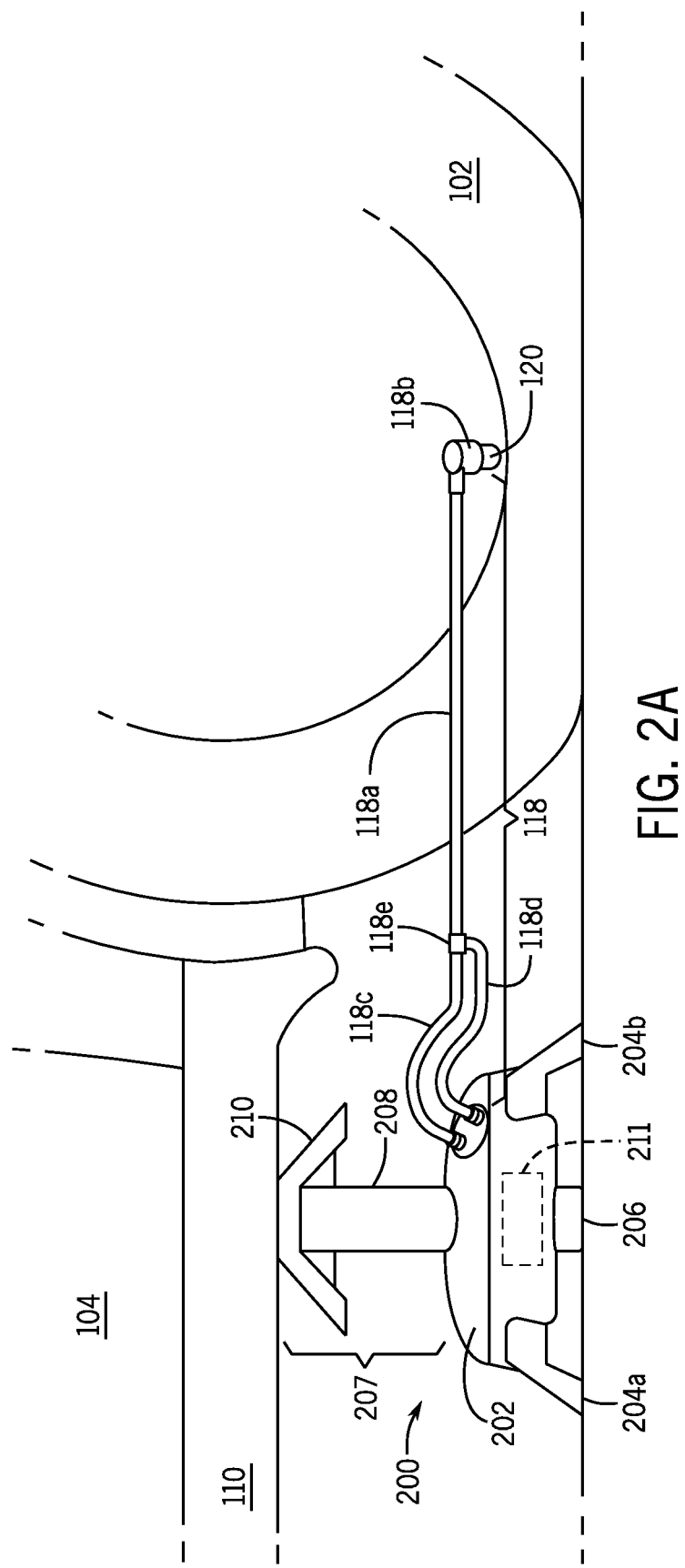

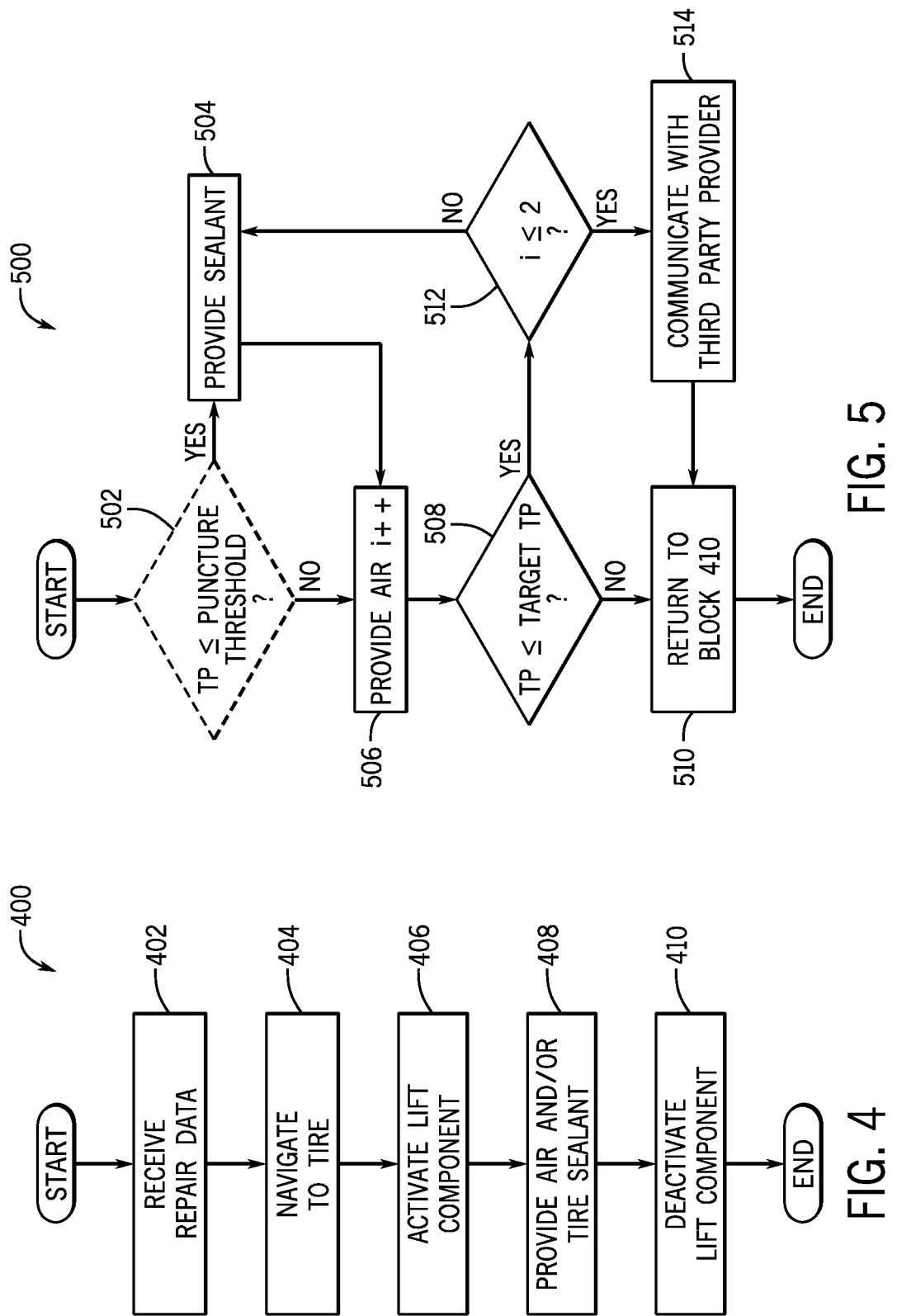

SYSTEM AND METHOD FOR TIRE REPAIR

BACKGROUND

Wheels and tires (e.g., on a vehicle) require regular maintenance. For example, tire rotation, tire balancing, and tire inflation correction performed regularly can help extend the life of the tires and ensure the vehicle is running properly. Furthermore, tire repair and replacement may be necessary. Wheel and tire maintenance services usually require that the vehicle be elevated by a machine, for example, using a lift. Once elevated, the wheel and/or tire can be serviced.

Machines for wheel and tire maintenance can provide automatic assistance as well as features to help a user manually service the wheels and tires. However, in many cases, an attempt to fix a tire may not be successful and different approaches to repairing the tire may be needed. Further, in some cases, the tire may not be salvageable, and a replacement tire is needed. Connected technology can provide additional information and options to the machines for servicing.

BRIEF DESCRIPTION

According to one aspect, a tire repair system for a vehicle includes a base and a lift component movably secured to the base for lifting a portion of a frame of the vehicle to thereby elevate a tire of the vehicle. The system includes an air compressor unit disposed on the base, the air compressor unit having a discharge hose configured to be selectively connected to the tire for delivering compressed air to the tire. Further, a sealant reservoir is disposed on the base and filled with a flat tire sealant. The discharge hose is optionally configured to deliver the flat tire sealant to the tire. Additionally, a controller disposed on one of the base and the lift component receives tire data from the vehicle and controls discharge of the compressed air from the air compressor unit to the tire. The controller optionally controls discharge of the flat tire sealant to the tire based on the tire data. The tire data includes a tire pressure reading associated with the tire.

According to another embodiment, a computer-implemented method for repairing a tire of a vehicle includes receiving tire data at a repair system from the vehicle. The tire data includes a tire pressure reading associated with the tire. The method includes activating a lift component of the repair system by engaging the lift component with a portion of a frame of the vehicle thereby moving the lift component and the tire upwards. The method includes controlling discharge of the compressed air from an air compressor unit of the repair system to the tire and optionally controlling discharge of flat tire sealant from a sealant reservoir of the repair system to the tire based on the tire data.

According to a further embodiment, a non-transitory computer-readable storage medium including instructions that when executed by a processor, cause the processor to receive tire data at a repair system from the vehicle. The tire data includes a tire pressure reading associated with a tire of a vehicle. The processor actuates a lift component of the repair system by engaging the lift component with a portion of a frame of the vehicle thereby moving the lift component and the tire upwards. The processor controls discharge of the compressed air from an air compressor unit of the repair system to the tire and optionally controls discharge of flat tire sealant from a sealant reservoir of the repair system to the tire based on the tire data.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2A is a schematic diagram of another repair device according to another exemplary embodiment;

FIG. 4 is a process flow diagram of a method for repair according to an exemplary embodiment; and FIG. 5 is a process flow diagram of a method for providing compressed air and/or sealant for repair according to an exemplary embodiment.

DETAILED DESCRIPTION

Figure 1A:
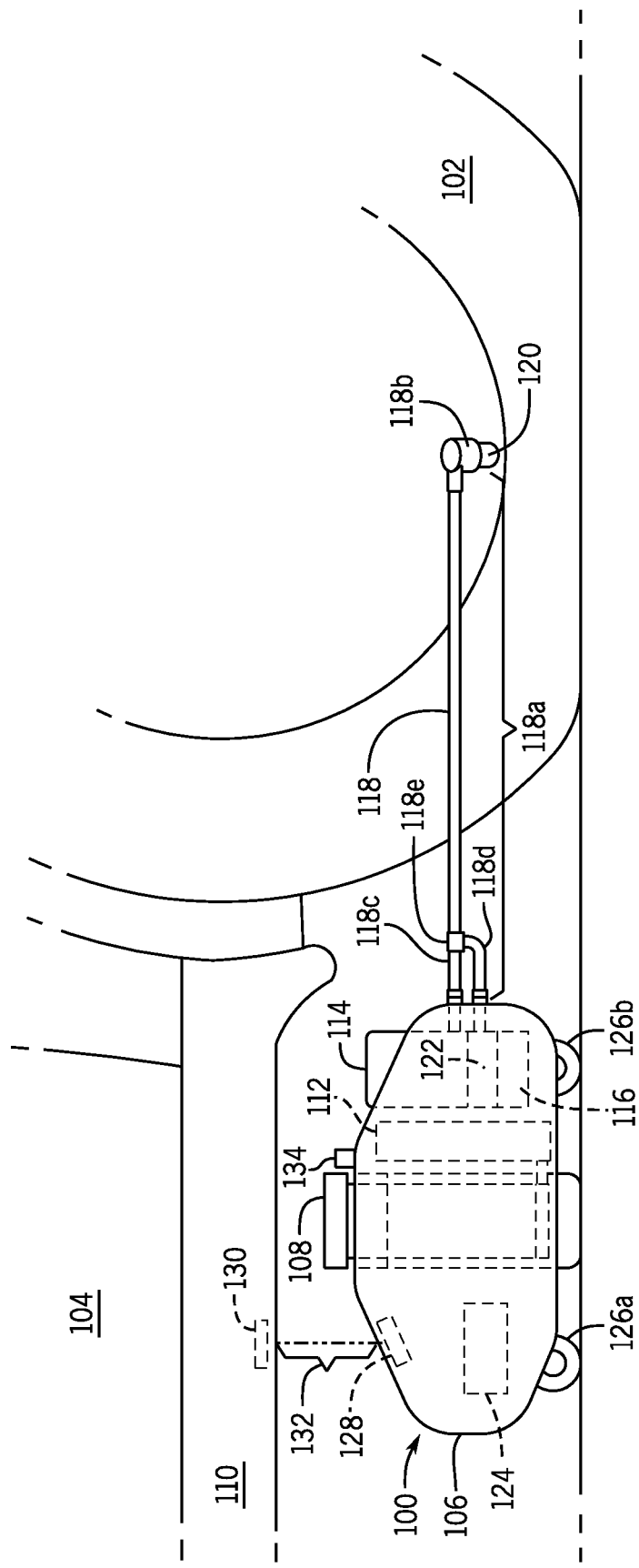
FIG. 1A is a schematic diagram of a repair device for servicing a tire of a vehicle according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1B:
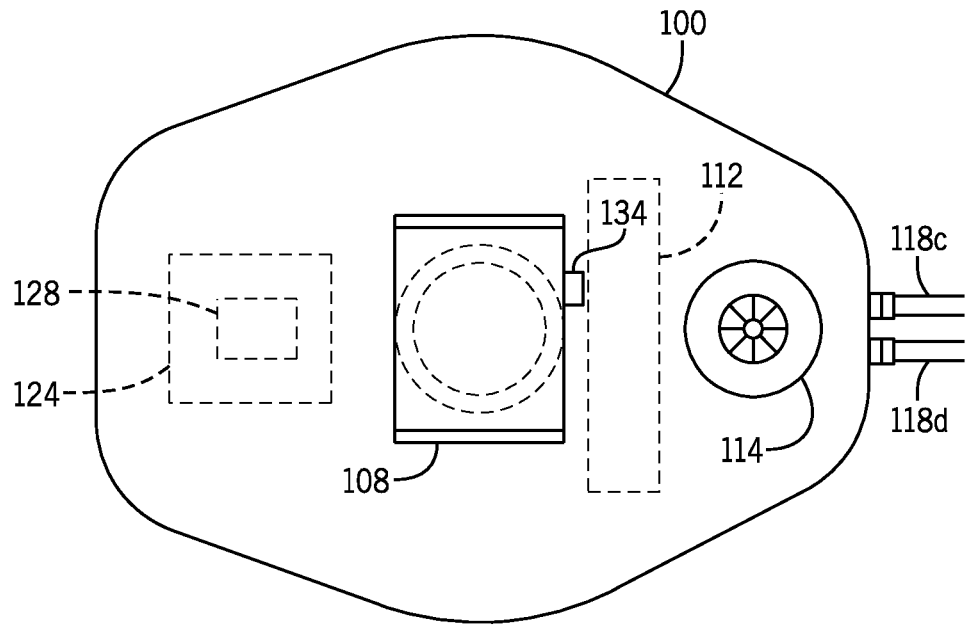
FIG. 1B is a top view of the repair device of FIG. 1A according to an exemplary embodiment.
Figure 1C:
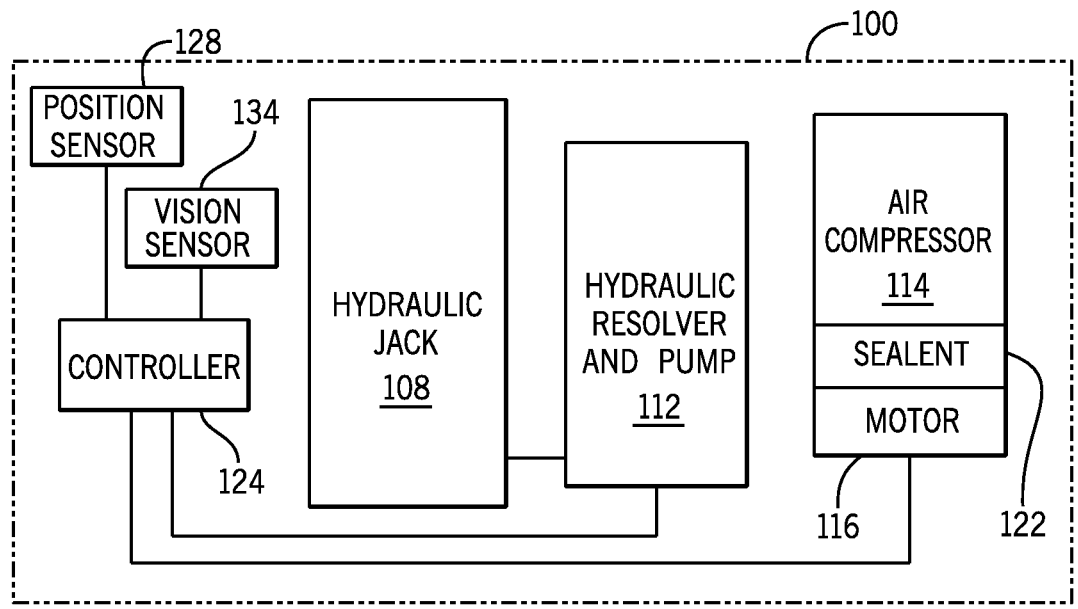
FIG. 1C is a block diagram of the repair device of FIG. 1A according to an exemplary embodiment.

The systems and methods discussed herein are generally directed to a repair device and repair system for servicing a component of a vehicle, for example, a tire or a wheel. Referring now to the drawings, wherein the showings are for purposes of illustrating one or more exemplary embodiments and not for purposes of limiting same, FIG. 1A illustrates a schematic diagram of a repair device 100 for servicing a tire 102 of a vehicle 104 according to an exemplary embodiment. FIG. 1B is a top view of the repair device 100 and FIG. 1C is a block diagram of the repair device 100. For simplicity, like numerals refer to like parts in all views of the drawing and throughout the description. In FIG. 1A, the repair device 100 includes a base 106 (e.g., a housing). The repair device 100 also includes a lift component 108 secured to the base 106 for lifting a portion of a frame 110 of the vehicle 104 to elevate the tire 102 of the vehicle 104. The controller 124 can control the lift component 108 to move vertically in an upward direction or a downward direction. In some embodiments, the lift component 108 is powered by hydraulics, for example, a hydraulic resolver and pump 112, however, it is understood that other forms of power can be implemented. The repair device 100 also includes an air compressor unit 114 disposed on the base 106. The air compressor unit 114 can be powered by a motor 116.

In FIG. 1A, a discharge hose 118 is configured to be selectively connected to the tire 102 for delivering compressed air to the tire 102. The discharge hose 118 includes a main body 118a with an attachment member 118b for engaging with the tire 102, for example, by engaging an air valve 120 of the tire 102. An adapter 118c and an adapter 118d are connected to the main body 118a by a "Y" shaped connector 118e. As show in FIG. 1A, the adapter 118c can attach to an external portion (e.g., a port) of the base 106 and act an inlet/outlet for the compressed air from the air compressor unit 114. Similarly, the adapter 118d can attach to an external portion (e.g., a port) of the base 106 and act as and inlet/outlet for sealant from a sealant reservoir 122, which will be discussed in further detail herein. Although the adapter 118c and the adapter 118d are shown incorporating a flexible hose, it is understood that a rigid connection can also be implemented. Further, although the discharge hose 118 shown in FIG. 1A comprises several components, it is understood that any number of hoses and/or components can be implemented. For example, a single hose attached to an external portion (e.g., a port) of the base 106.

The repair device 100 also includes a sealant reservoir 122 disposed on the base 106 that can be filled with a repair sealant, for example, a flat tire sealant or any other type of puncture sealant material. As discussed above, the discharge hose 118 is optionally configured to deliver the flat tire sealant to the tire 102. Furthermore, the repair device 100 includes a controller 124 disposed on one of the base 106 and the lift component 108. As will be discussed in further detail herein, the controller 124 can be operatively connected for computer communication with the vehicle 104. In particular, the controller 124 can receive tire data from the vehicle 104 and control repair of the tire 102 using the repair device 100. More specifically, the controller 124 can control discharge of the compressed air from the air compressor unit 114 to the tire 102 and optionally controls discharge of the flat tire sealant from the sealant reservoir 122 to the tire 102 based on the tire data. As will be discussed herein, the tire data can include a tire pressure reading associated with the tire 102.

Furthermore, the controller 124 can control movement of the repair device 100. More specifically, the repair device 100 can include wheels driven by a power source, for example, the motor 116. In FIG. 1A, the repair device 100 includes a first wheel 126a and a second wheel 126b, however, it is understood that in other embodiments, the repair device 100 can include any number of wheels (e.g., one wheel, three wheels) or any other type of components to facilitate movement (e.g. propeller, wing). In one embodiment, the repair device 100 includes a position sensor 128 for aligning the repair device 100 with respect to the tire 102, the vehicle 104, and more particularly, the portion of the frame 110. As shown in FIG. 1A, the portion of the frame 110 can include a reflective component 130. When the repair device 100 is in proper alignment with the tire 102, the vehicle 104, and/or the portion of the vehicle frame 110, the position sensor 128 receives a reflection signal 132 from the reflective component 130 of the portion of the vehicle frame 110. As will be discussed herein, actuation of tire repair can be initiated based on receipt of the reflection signal 132.

In a further embodiment, the controller 124 can control movement of the repair device 100 to the vehicle 104 and/or the tire requiring repair (e.g., the tire 102) using computer vision and/or object detection. For example, the repair device 100 can include a vision sensor 134 for capturing images and/or video of a surrounding environment of the repair device 100. As will be discussed herein, images captured by the vision sensor 134 can be used to assist the controller 124 in navigating the repair device 100 to the vehicle 104 and/or the tire 102. The vision sensor 134 can also be used to assist aligning or positioning the repair device 100 as discussed above. The vision sensor 134 can be any type of image capture sensor and/or device, for example a charge-coupled device sensor (CCD sensor), a complementary metal-oxide-semiconductor (CMOS), a hybrid semiconductor imaging technology, an infrared camera, and other types of digital, stereo, video devices and sensors, among others. In some embodiments, the vision sensor 134 could also include ranging sensors (e.g., RADAR/LIDAR). It is understood that the vision sensor 134 can be disposed on or within in one more portions of the repair device 100. For example, although not shown in FIG. 1A, the vision sensor 134 can be disposed on a front portion of the repair device 100 or a rear portion of the repair device 100. Further, more than one vision sensor 134 can be disposed on the repair device 100.

Figure 2B:
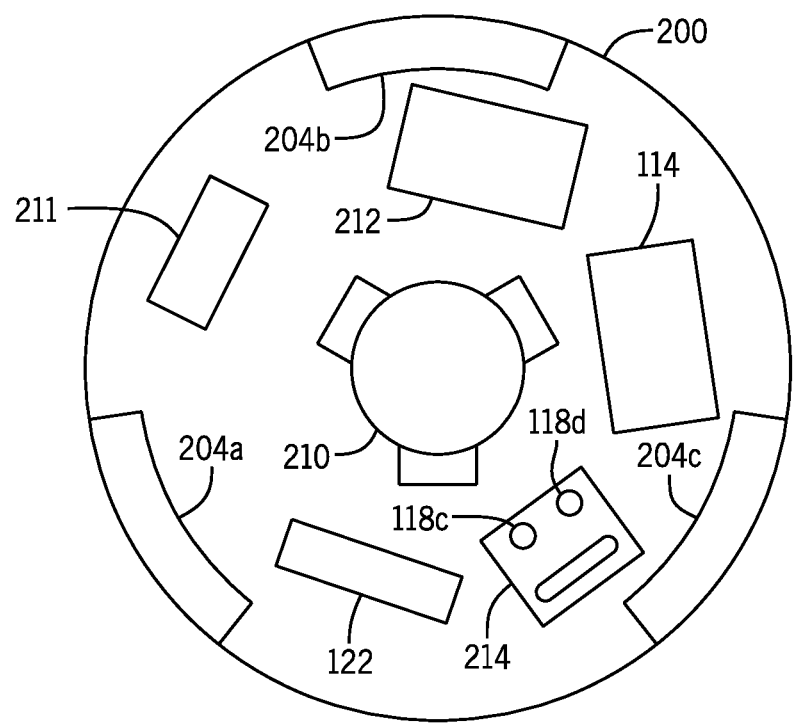
FIG. 2B is a top view of the repair device of FIG. 2A.

It is appreciated that the repair device 100 and the components thereof can be organized into different configurations. For example, another exemplary embodiment of a repair device 200 is shown in FIGS. 2A and 2B. For simplicity, like numerals refer to like parts in all views of the drawing and throughout the description. Here, the repair device 200 includes a base 202 and is supported by a stabilization leg 204*a*, a stabilization leg 204*b*, a stabilization leg 204*c*, and a support leg 206. In FIG. 2A, a lift component 207 includes a hydraulic arm 208 and an engagement component 210. The hydraulic arm 208 can control movement of the engagement component 210 vertically in an upwards or downward direction. The hydraulic arm 208 is powered by a hydraulic resolver and pump 211. Although not shown in FIG. 2A, in some embodiments, the engagement component 210 can include the position sensor 128 to assist aligning the repair device 200 with the portion of the frame 110 of the vehicle 104. Additionally, although not shown in FIG. 2A, the vision sensor 134 can be included to assist aligning, positioning, and/or navigating the repair device 200. As shown in FIG. 2B, the repair device 200 includes an air compressor unit 114 and a sealant reservoir 122. In this embodiment, the repair device 200 is powered by a power source 212, for example, a 12V battery. Furthermore, the repair device 200 includes a compartment 214 to store one or more components of the discharge hose 118.

Figure 3:
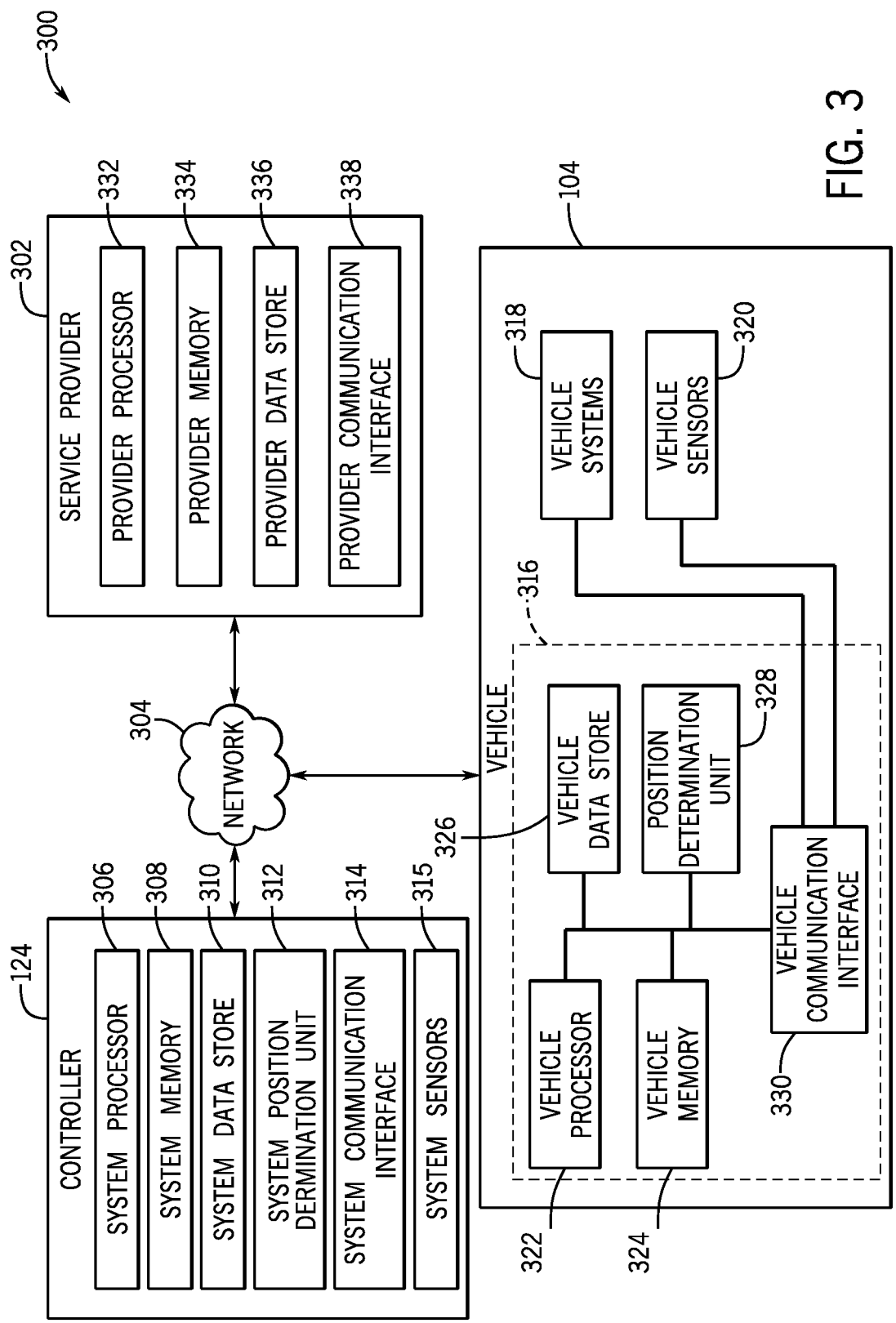
FIG. 3 is an exemplary architecture of a repair system according to an exemplary embodiment.

An exemplary repair system will now be described with reference to FIG. 3. For simplicity, the examples discussed herein will be with reference to the repair device 100 of FIGS. 1A, 1B, and 1C. However, it is understood that the systems and methods discussed herein can be implemented with the repair device 200 of FIGS. 2A and 2B. With reference to FIG. 3, an exemplary architecture 300 for a repair system is shown. For simplicity, like numerals refer to like parts in all views of the drawing and throughout the description. In FIG. 3, the repair device 100, the vehicle 104, and a service provider 302 are each operably connected for computer communication using, for example, a communication network 304. As will be discussed herein, data can be exchanged between one or more of the repair device 100, the vehicle 104, and/or the service provider 302.

In FIG. 3, the controller 124 includes a system processor 306, a system memory 308, a system data store (e.g., a disk) 310, a system position determination unit 312, a system communication interface 314, and system sensors 315, each of which can be operably connected for computer communication via a bus or other wired or wireless technologies. The system processor 306 can include logic circuitry with hardware, firmware, and software architecture frameworks. Thus, in some embodiments, the system processor 306 can store application frameworks, kernels, libraries, drivers, application program interfaces, among others, to execute and control hardware and functions discussed herein. In some embodiments, the system memory 308 and/or the system data store 310 can store similar components as the system processor 306 for execution by the system processor 306. The system memory 308 and/or the system data store 310 can also store other types of information and data that may be accessed and/or executed by the system processor 306.

The system position determination unit 312 can be a global positioning system (GPS) unit and/or an inertial measurement unit (IMU). In some embodiments, the system position determination unit 312 can be a navigation system that provides navigation maps and navigation information to the repair device 100. For example, in one embodiment, the system position determination unit 312 can assist the controller 124 to autonomously move the repair device 100 to the tire 102 of the vehicle 104 based on tire data received from the vehicle 104. Thus, the system position determination unit 312 can determine a position and/or orientation of the repair device 100 and navigate the repair device 100 to the tire 102.

In some embodiments, the controller 124 can use the system position determination unit 312 and/or the vision sensors 134 to assist locating the tire 102 (e.g., the tire to be repaired), navigating the repair device 100 to the tire 102, and aligning and/or positioning the repair device 100 with the tire 102 for repair. For example, location data from the system position determination unit 312 and/or images from the vision sensors 134 can be used for navigation, object detection, and other computer vision techniques. In one embodiment, the controller 124 can use a three-dimensional model (not shown) of the vehicle 104 (e.g., stored at the system data store 310) and the vision sensors 134 to determine the repair device 100 location on the ground relative to the vehicle 104 and based on the location, the controller 124 navigates the repair device 100 to the tire 102.

The system communication interface 314 can include software and hardware to facilitate data input and output between the components of the repair device 100 and other components of the architecture 300. Specifically, the system communication interface 314 can include network interface controllers (not shown) and other hardware and software that manages and/or monitors connections and controls bi-directional data transfer between the system communication interface 314 and other components of the architecture 300, using for example, the communication network 304.

The system sensors 315 can include any systems and/or sensors for sensing and measuring a stimulus (e.g., a signal, a property, a measurement, and a quantity) associated with the repair device 100, other systems of the repair device 100 (e.g., the hydraulic resolver and pump 112, the air compressor unit 114), and/or an environment or object in a surrounding area of the repair device 100. For example, the position sensor 128 and/or the vision sensor 134 can be part of the system sensors 315. It is understood that any other number or type of sensor can be implemented with the system sensors 315

As shown in FIG. 3, the vehicle 104 can include a vehicle computing device (VCD) 316, vehicle systems 318, and vehicle sensors 320. Similar to the controller 124, the VCD 316 includes a vehicle processor 322, a vehicle memory 324, a vehicle data store 326, a vehicle position determination unit 328, and a vehicle communication interface 330, which are each operably connected for computer communication via a bus and/or other wired and wireless technologies defined herein.

The vehicle systems 318 can include any type of vehicle control system and/or vehicle described herein to enhance the vehicle 104 and/or driving of the vehicle 104. For example, the vehicle systems 318 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). Further, in some embodiments, the vehicle systems 318 can include a tire pressure monitoring system (TPMS) that provides real-time tire pressure information about one or more of the tires (e.g., the tire 102) of the vehicle 104. As will be discussed herein, data captured by the TPMS can be communicated to the repair device 100 as tire data.

The vehicle sensors 320, which can be implemented with the vehicle systems 318, can include various types of sensors for use with the vehicle 104 and/or the vehicle systems 318 for detecting and/or sensing a parameter of the vehicle 104 and/or the vehicle systems 318. For example, the vehicle sensors 320 can capture and provide tire data and/or repair as discussed herein. For example, TPMS sensors can measure tire pressure information about the tire 102 in real-time. The vehicle sensors 320 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the vehicle sensors 320 can be any type of sensor, for example, acoustic, electric, environmental, optical, imaging, light, pressure, force, thermal, temperature, proximity, among others.

As mentioned above, in some embodiments data transmission can be executed at and/or with other infrastructures and servers. For example, in FIG. 3, the VCD 316 can transmit and receive information directly or indirectly to and from the repair device 100 (e.g., the controller 124) over the communication network 304. The repair device 100 can also transmit and receive information directly or indirectly to and from the service provider 302. The service provider 302 can be a third party server and/or a third party roadside assistance service. In FIG. 3, the service provider 302 can include a provider processor 332, a provider memory 334, provider data store 336, and a provider communication interface 338 that are configured to be in communication with one another via a bus (not shown) and/or other wired or wireless technologies. Similarly, the service provider 302 can transmit and receive information directly or indirectly to and from the repair device 100 and/or the vehicle 104 over the communication network 304.

The repair device 100 and the architecture 300 will now be described in more detail with reference to FIG. 4 and a method 400 for repair according to an exemplary embodiment. The method 400 will be described with respect to FIGS. 1A, 1B, 1C, and 3. However, it is understood that the method 400 can also be implemented with the repair device 200 of FIGS. 2A and 2B. At block 402, the method 400 includes receiving tire data at the repair device 100. For example, the controller 124 can establish an operable connection for computer communication with the VCD 316 via the communication network 304 or vice versa. The VCD 216 can transmit tire data to the controller 124. The tire data can include, but is not limited to, a tire pressure reading associated with one or more tires of the vehicle 104. The tire data can be captured by the vehicle systems 318 and/or the vehicle sensors 320. The tire data can also include a position of one or more of the tires of the vehicle 104 as determined by the vehicle position determination unit 328. The tire data can also include a position of the vehicle 104. In addition or alternatively, the tire data can include identification of which tire of the one or more tires needs repair and the associated tire pressure reading and position. Accordingly, in one embodiment, the controller 124 can receive a tire pressure reading and a position of each tire of the vehicle 104. In other embodiments, the VCD 216 may transmit a tire pressure reading and a position of a single tire to be repaired, for example, the tire 102.

Based on the tire data, at block 404, the method 400 includes controlling the repair device 100 to navigate to the tire 102. As mentioned with FIG. 1A, the repair device 100 includes the first wheel 126a and the second wheel 126b. It is appreciated that in other embodiments, the repair device 100 can have any number of wheels, for example, one wheel or three wheels. The motor 116 can drive the first wheel 126a and the second wheel 126b, and the controller 124 can control movement of the repair device 100 via the first wheel 126a and the second wheel 126b. For example, the controller 124 controls the movement of the repair device 100 relative to the vehicle 104 and the tire 102 based on the tire data received at block 402, where the tire data includes a location of the tire 102 and/or a location of the vehicle 104. Using, for example, the system position determination unit 312 and/or the vision sensors 134, the controller 124 can guide the repair device 100 to the tire 102 (i.e., the tire to be repaired). Thus, the repair device 100 is autonomously controlled to position itself relative to the tire 102 to be repaired.

In another embodiment, the controller 124 can utilize the system position determination unit 312 and/or the vision sensors 134 to locate a tire to be repaired (e.g., the tire 102) and subsequently navigate to said tire. In this embodiment, the repair device 100 may not need to receive the tire data and/or location data at block 402. For example, in one embodiment, the controller 124 can use a three-dimensional model (not shown) of the vehicle 104 (e.g., stored at the system data store 310) and the vision sensors 134 to determine the repair device 100 location on the ground relative to the vehicle 104 and/or the tire 102 and based on the location, the controller 124 navigates the repair device 100 to the vehicle 104 and/or the tire 102. In a further embodiment, the controller 124 can detect which tire needs to be repaired (e.g., damaged, flat) using images from the vision sensors 134 and object recognition and image processing. For example, using the images, the controller 124 can determine the tire to be repaired by identifying damage (e.g., puncture, bubble, foreign object) to the tire using the images. As another example, the controller 124 can identify a flat tire by determining a height of the tire with respect to the vehicle 104 and/or the other tires of the vehicle 104. If the height is less than a predetermined threshold and/or the height is less than the other tires of the vehicle 104, the controller 124 can identify the tire as the tire to be repaired and navigate the repair device 100 to the identified tire.

Furthermore, in some embodiments, the controller 124 can align the repair device 100 with the portion of the frame 110 of the vehicle 104 using, for example, the position sensor 128 and/or the vision sensor 134. As discussed above with FIG. 1A, when the repair device 100 is aligned with the vehicle 104, the position sensor 128 can receive a reflection signal from the frame 110 (e.g., the reflective component 130) of the vehicle 104. Receipt of the reflection signal indicates that the repair device 100 is in proper alignment to actuate the lift component 108 and thus initiate repair of the tire 102.

Accordingly, at block 406 the method includes activating the lift component 108 of the repair device 100 by engaging the lift component 108 with a portion of the frame 110 of the vehicle 104 thereby moving the lift component 108 and the tire 102 in an upwards direction. Thus, the controller 124 controls the lift component 108 vertically in an upwards direction to engage the portion of the frame 110 and thereby lift the tire 102 in an upwards direction. By lifting the tire 102 upwards, the tire 102 can be serviced for repair.

At block 408, the method 400 includes controlling discharge of the compressed air from the air compressor unit 114 of the repair device 100 to the tire 102, and optionally controlling discharge of flat tire sealant from the sealant reservoir 122 of the repair device to the tire 102 based on the tire data. In some embodiments, the repair device 100 provides an indication to a user (not shown) to connect the discharge hose 118 to the tire 102. For example, a visual or audible output could be provided by the system communication interface 314, for example using a display (not shown) or speakers (not shown). Once the discharge hose 118 is attached (e.g., the attachment member 118b to the air valve 120), the repair device 100 can proceed with repairing the tire 102. In some embodiments, when the discharge hose 118 is connected to the tire 102, a signal is sent to the controller 124 and the controller 124 begins repair.

Block 408 will now be described in more detail with the method 500 of FIG. 5. At block 502, the controller 124 can optionally determine whether a puncture exists in the tire 102. Thus, the controller 124 can selectively determine whether to initially provide the compressed air or the sealant to the tire 102. Alternatively, in some embodiments, the vehicle 104 can indicate whether a puncture exists and transmit said indication as a part of the tire data. Further, in other embodiments, it is understood that the compressed air and sealant could be provided simultaneously to the tire 102.

Accordingly, at block 502, the controller 124 determines whether the tire pressure is less than or equal to a puncture threshold. If YES, a puncture exists in the tire 102 and the method 500 proceeds to block 504 where the controller 124 controls discharge of the sealant from the sealant reservoir 122 to the tire 102 via the discharge hose 118. The method 500 then proceeds to block 506. Similarly, if the determination at block 502 is NO, a puncture does not exists in the tire 102, and the method 500 proceeds to block 506. At block 506, the controller 124 controls discharge of the compressed air from the air compressor unit 114 to the tire 102 via the discharge hose 118. In some embodiments, a counter i indicating how many times the controller 124 has attempted to repair the tire 102 using the compressed air can be incremented at block 506.

At block 508, the method 500 includes comparing the current tire pressure to a target tire pressure. In one embodiment, the VCD 316 transmits the current air pressure (e.g., as measured by the TPMS) to the controller 124 in real-time as the controller 124 discharges compressed air into the tire 102. In other embodiments, the repair device 100 includes a pressure gauge (not shown) that measures the current air pressure of the tire 102 as the controller discharges the compressed air into the tire 102. The target air pressure can be a value stored at the controller 124 and/or transmitted by the VCD 316 (e.g., as tire data).

Accordingly, at block 508, the controller 124 determines whether the tire 102 has been repaired and/or the tire 102 is properly inflated. If the tire 102 is repaired (i.e., NO), at block 510, the method 500 returns to block 410 of FIG. 4. If the tire 102 is not repaired (i.e., YES), the method 500 proceeds to block 512 where it is optionally determined whether the counter i has reached a predetermined threshold. In FIG. 5, the threshold is 2, indicating that the repair device 100 has attempted to repair the tire 102 twice. It is understood that in other embodiments, the predetermined threshold can be set to other values. If the determination at block 512 is NO, sealant is provided at block 504 as described above.

If the determination at block 512 is YES, the tire 102 is not repaired and the method 500 proceeds to block 514. Here, the controller 124 can communicate with the service provider 302. In one embodiment, the controller 124 can transmit repair data to the service provider 302. For example, a current tire pressure, a location of the tire 102, a location of the vehicle 104, tire data transmitted from the VCD 316, an amount of sealant provided to the tire 102, an amount of compressed air provided to the tire 102, and any other information about the repair of the tire 102 performed by the repair device 100.

In some embodiments, the controller 124 can determine whether a spare tire is available. For example, data about a spare tire can be transmitted with the tire data from the VCD 316. If the tire 102 is not repairable, the controller 124 can determine whether a spare tire is available based on the tire data. If spare tire is available, the controller 124 can provide a visual or audible output to replace the tire 102 with the spare tire. Alternatively, information about the spare tire can be transmitted to the service provider 302 (e.g., as repair data).

The service provider 302 can use the repair data to provide services to the vehicle 104. For example, the service provider 302 can dispatch a repair vehicle (not shown) to the vehicle 104 to fix the tire 102 and/or tow the vehicle 104. In one embodiment, the service provider 302 can communicate with the vehicle 104 using the repair device 100 and/or the communication network 304 to notify a user of the vehicle 104 that a repair vehicle has been dispatched. It is understood that other types of roadside assistance can be provided by the service provider 302.

Referring again to FIG. 4, at block 410, the method 400 includes deactivating the lift component 108. Thus, the controller 124 can control the lift component 108 vertically in a downward direction. The repair device 100 can also provide an indication that the repair process has completed. For example, a visual or audible output could be provided by the system communication interface 314, for example using a display (not shown) or speakers (not shown).

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A repair system for a vehicle, comprising:
   a base;
   wheels disposed on the base;
   a power source disposed on the base configured to controllably drive the wheels;
   a lift component movably secured to the base configured to controllably lift or controllably lower a portion of a frame of the vehicle to thereby elevate or lower a tire of the vehicle relative to ground level;
   a discharge hose configured to controllably connect to the tire, controllably disconnect from the tire, and controllably execute at least one discharge operation comprising selectively discharging either compressed air or flat tire sealant to the tire when controllably connected to the tire;
   an air compressor unit disposed on the base configured to controllably deliver the compressed air to the tire when controllably connected to the discharge hose while the discharge hose is controllably connected to the tire;
   a sealant reservoir disposed on the base and filled with a flat tire sealant configured to controllably deliver the flat tire sealant to the tire when controllably connected to the discharge hose while the discharge hose is controllably connected to the tire; and
   a controller disposed on one of the base and the lift component and in operable communication with the wheels, the power source, the lift component, the discharge hose, the air compressor unit, and the sealant reservoir, wherein the controller is configured to execute the following method:

(a) receive tire data from the vehicle comprising at least a location of the tire,
(b) initialize a repair attempt counter value to zero,
(c) access a predetermined maximum number of failed tire repair attempts permitted before determining that the tire is unrepairable, a predetermined puncture threshold indicative of a first minimum tire pressure reading value expected for a non-punctured tire, and a predetermined target tire pressure indicative of a second minimum tire pressure reading value expected for a properly repaired tire,
(d) control movement of the base via the wheels relative to the tire based on the location of the tire, control movement of the lift component to lift the frame of the vehicle relative to the ground level, and control movement of the discharge hose relative to the tire, wherein a collective controlled movement of each of the base, the lift component, and the discharge hose enables a connection of the discharge hose to the tire,
(e) receive or determine a current tire pressure reading of the tire and chronologically associate the current tire pressure reading with the tire data from the vehicle,
(f) when the repair attempt counter value is zero, set a check value to be the predetermined puncture threshold, and otherwise set the check value to be the predetermined target tire pressure,
(g1) when the current tire pressure reading of the tire is below the check value, execute a first discharge operation to control discharge of the flat tire sealant from the sealant reservoir through the discharge hose to the tire, and execute a second discharge operation to control the air compressor to discharge the compressed air through the discharge hose to the tire,
(g2) when the current tire pressure reading of the tire is at or above the check value, execute the second discharge operation to control the air compressor to discharge the compressed air through the discharge hose to the tire without first executing the first discharge operation,
(h) re-receive or redetermine the current tire pressure reading, and determine whether the current tire pressure reading of the tire re-received or redetermined after the second discharge operation is below the predetermined target tire pressure,
(i1) when the current tire pressure reading of the tire re-received or redetermined after the second discharge operation is below the predetermined target tire pressure, increment the repair attempt counter value by one,
(i2) when the current tire pressure reading of the tire re-received or redetermined after the second discharge operation is equal to or above the predetermined target tire pressure, determine that the tire has been successfully repaired and skip to step I,
(i) determine whether a current value of the repair attempt counter is equal to or below the predetermined maximum number of failed tire repair attempts permitted,
(k1) when it is determined that the current tire pressure reading of the tire re-received or redetermined after the second discharge operation is below the predetermined target tire pressure and it is determined that the current value of the repair attempt counter is below the predetermined maximum number of failed tire repair attempts permitted, go back to step e,
(k2) when it is determined that the current tire pressure reading of the tire re-received or redetermined after the second discharge operation is below the predetermined target tire pressure and it is determined that the current value of the repair attempt counter is equal to the predetermined maximum number of failed tire repair attempts permitted, determine that the tire is unrepairable, and transmit the tire data to a service provider to include information indicative that the tire is unrepairable,
(l) when it is determined that the tire has been successfully repaired, control the disconnection of the discharge hose from the tire, and transmit the tire data to the service provider to include information indicative that the tire has been successfully repaired; and
(m) control the lift component to lower the portion of the frame of the vehicle to thereby bring the tire of the vehicle back to the ground level.

2. The repair system of claim 1, further including a sensor disposed on the base and in operable communication with the controller, wherein when executing step (d) the controller is further configured to control the lift component to move in an upward direction relative to the ground level when the sensor receives a reflection signal from the frame of the vehicle.

3. The repair system of claim 1, wherein receiving or determining the current tire pressure reading of the tire and re-receiving or redetermining the current tire pressure reading of the tire comprises one or both of: (a) the vehicle transmitting the current tire pressure reading of the tire to the controller, and/or (b) wherein the repair system further comprises a tire pressure gauge disposed on the base and in operable connection with the controller, wherein the tire pressure gauge is configured to controllably determine the current tire pressure reading of the tire when the discharge hose is controllably connected to the tire and the discharge hose is not actively executing the first discharge operation.

4. The repair system of claim 1, wherein when it has been determined that the tire is unrepairable the controller is further configured to determine whether the vehicle is equipped with a spare tire based on the tire data, and when the controller determines that the vehicle is not equipped with the spare tire based on the tire data, include an indication that a new tire needs to be ordered to the tire data prior to the tire data being transmitted to the service provider.

5. A non-transitory computer-readable medium including instructions that, when executed by a processor of a repair system for a vehicle, the repair system further including a base, wheels disposed on the base, a power source disposed on the base configured to controllably drive the wheels, a lift component movably secured to the base configured to controllably lift or controllably lower a portion of a frame of the vehicle to thereby elevate or lower a tire of the vehicle relative to ground level, a discharge hose configured to controllably connect to the tire, controllably disconnect from the tire, and controllably execute at least one discharge operation comprising selectively discharging either compressed air or flat tire sealant to the tire when controllably connected to the tire, an air compressor unit disposed on the base and configured to controllably deliver the compressed air to the tire when controllably connected to the discharge hose while the discharge hose is controllably connected to the tire, and a sealant reservoir disposed on the base and filled with a flat tire sealant configured to controllably deliver the flat tire sealant to the tire when controllably connected to the discharge hose while the discharge hose is controllably connected to the tire, and the processor being disposed on one of the base and the lift component and in operable communication with the wheels, the power source, the lift component, the discharge hose, the air compressor unit, and the sealant reservoir, cause the processor to:

(a) receive tire data from the vehicle comprising at least a location of the tire, (b) initialize a repair attempt counter value to zero, (c) access a predetermined maximum number of failed tire repair attempts permitted before determining that the tire is unrepairable, a predetermined puncture threshold indicative of a first minimum tire pressure reading value expected for a non-punctured tire, and a predetermined target tire pressure indicative of a second minimum tire pressure reading value expected for a properly repaired tire, (d) control movement of the base via the wheels relative to the tire based on the location of the tire, control movement of the lift component to lift the frame of the vehicle relative to the ground level, and control movement of the discharge hose relative to the tire, wherein a collective controlled movement of each of the base, the lift component, and the discharge hose enables a connection of the discharge hose to the tire, (e) receive or determine a current tire pressure reading of the tire and chronologically associate the current tire pressure reading with the tire data from the vehicle, (f) when the repair attempt counter value is zero, set a check value to be the predetermined puncture threshold, and otherwise set the check value to be the predetermined target tire pressure, (g1) when the current tire pressure reading of the tire is below the check value, execute a first discharge operation to control discharge of the flat tire sealant from the sealant reservoir through the discharge hose to the tire, and execute a second discharge operation to control the air compressor to discharge the compressed air through the discharge hose to the tire, (g2) when the current tire pressure reading of the tire is at or above the check value, execute the second discharge operation to control the air compressor to discharge the compressed air through the discharge hose to the tire without first executing the first discharge operation, (h) re-receive or redetermine the current tire pressure reading, and determine whether the current tire pressure reading of the tire re-received or redetermined after the second discharge operation is below the predetermined target tire pressure, (i1) when the current tire pressure reading of the tire re-received or redetermined after the second discharge operation is below the predetermined target tire pressure, increment the repair attempt counter value by one, (i2) when the current tire pressure reading of the tire re-received or redetermined after the second discharge operation is equal to or above the predetermined target tire pressure, determine that the tire has been successfully repaired and skip to step I, (j) determine whether a current value of the repair attempt counter is equal to or below the predetermined maximum number of failed tire repair attempts permitted, (k1) when it is determined that the current tire pressure reading of the tire re-received or redetermined after the second discharge operation is below the predetermined target tire pressure and it is determined that the current value of the repair attempt counter is below the predetermined maximum number of failed tire repair attempts permitted, go back to step e, (k2) when it is determined that the current tire pressure reading of the tire re-received or redetermined after the second discharge operation is below the predetermined target tire pressure and it is determined that the current value of the repair attempt counter is equal to the predetermined maximum number of failed tire repair attempts permitted, determine that the tire is unrepairable, and transmit the tire data to a service provider to include information indicative that the tire is unrepairable, (l) when it is determined that the tire has been successfully repaired, control the disconnection of the discharge hose from the tire, and transmit the tire data to the service provider to include information indicative that the tire has been successfully repaired; and (m) control the lift component to lower the portion of the frame of the vehicle to thereby bring the tire of the vehicle back to the ground level.

6. The non-transitory computer-readable medium of claim 5, wherein receiving or determining the current tire pressure reading of the tire and re-receiving or redetermining the current tire pressure reading of the tire comprises the instructions causing the processor to execute one or both of: (a) receiving the current tire pressure reading of the tire at the processor transmitted by the vehicle, and/or (b) when the repair system further comprises a tire pressure gauge disposed on the base and in operable connection with the processor, controlling the tire pressure gauge to determine the current tire pressure reading of the tire when the discharge hose is controllably connected to the tire and the discharge hose is not actively executing the first discharge operation.

* * * * *